United States Patent [19]
Ayers

[11] Patent Number: 4,602,652
[45] Date of Patent: Jul. 29, 1986

[54] PRESSURE VESSEL SAFETY VALVE

[75] Inventor: Ray R. Ayers, Houston, Tex.

[73] Assignee: Shell Oil Company, Houston, Tex.

[21] Appl. No.: 622,021

[22] Filed: Jun. 20, 1984

Related U.S. Application Data

[60] Division of Ser. No. 450,323, Dec. 16, 1982, abandoned, which is a continuation of Ser. No. 218,157, Dec. 19, 1980, abandoned.

[51] Int. Cl.⁴ .............................................. F16L 55/18
[52] U.S. Cl. ................................... 137/15; 220/85 V; 220/89 A; 137/67
[58] Field of Search ........................................... 137/15

[56] References Cited

U.S. PATENT DOCUMENTS

| | | | |
|---|---|---|---|
| 2,204,816 | 6/1940 | Niederreither | 137/67 |
| 3,412,742 | 11/1968 | Smith | 137/68 R |
| 4,142,544 | 3/1979 | Straub | 137/67 |

FOREIGN PATENT DOCUMENTS

| | | | |
|---|---|---|---|
| 632528 | 12/1961 | Canada | 137/68 R |

Primary Examiner—Harold W. Weakley

[57] ABSTRACT

A pressure vessel is provided with a single use safety valve composed of a partially buckled, hollow chamber which is susceptible to further buckling at a preselected pressure. The chamber is mounted and elastomerically sealed in an opening in the vessel held in position by a support frame either interior to or exterior of the vessel.

4 Claims, 4 Drawing Figures

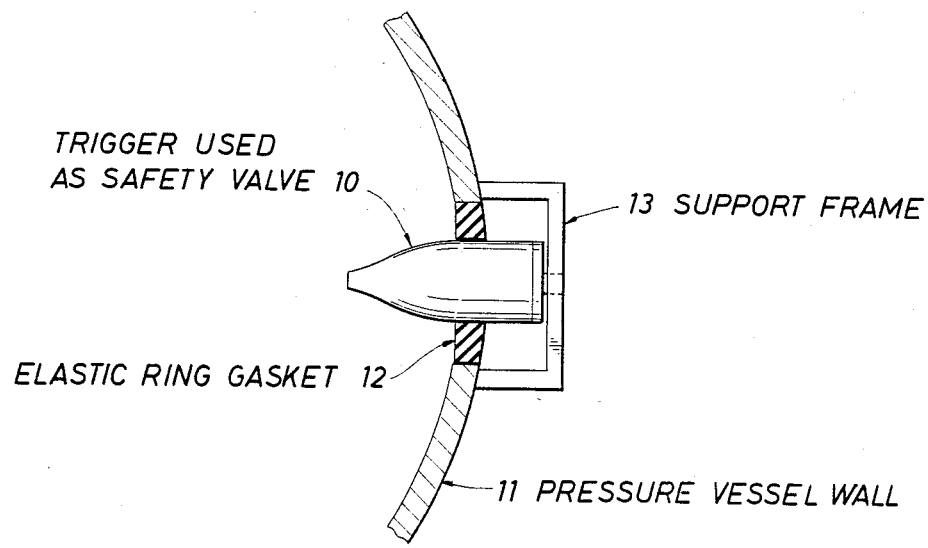
FIG. 1
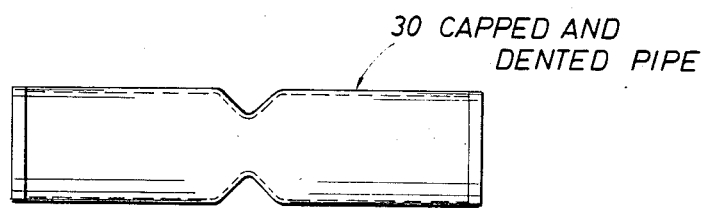
FIG. 2A  MECHANICALLY DENT THE CENTER OF A CAPPED STUBB PIPE.

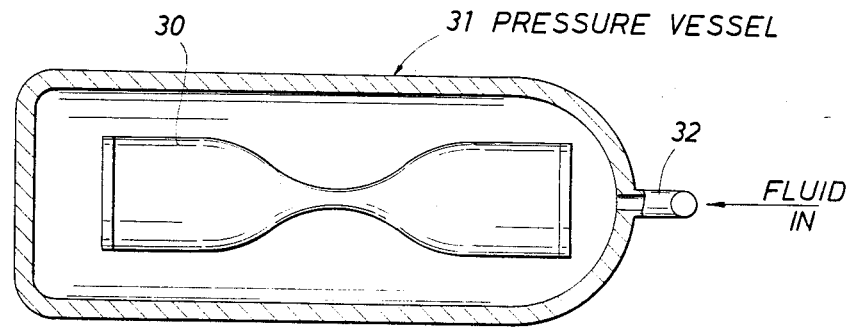
FIG. 2B PLACE PIPE IN PRESSURE VESSEL AND PROPAGATE BUCKLE SOMEWHAT FURTHER BY PUMPING HYDRAULIC FLUID (OR WATER) INTO THE VESSEL. NOTE THE PRESSURE REQUIRED TO PROPAGATE THE BUCKLE: THIS WILL BE RELEASE PRESSURE OF THE RELEASE MECHANISM.
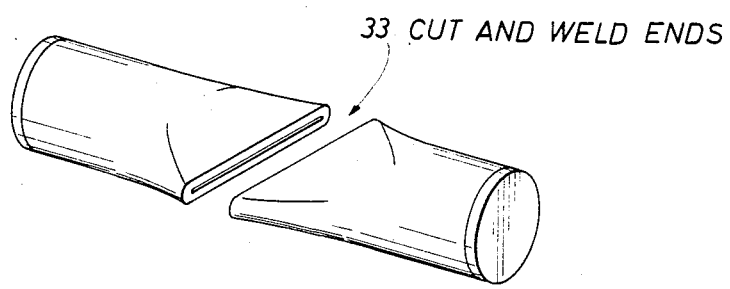
FIG. 2C CUT PIPE IN HALF AND WELD SHUT THE ENDS. ADD FITTINGS AS NECESSARY, MAKING SURE THE PIPE ELEMENT IS PRESSURE TIGHT.

PRESSURE VESSEL SAFETY VALVE

This is a division of application Ser. No. 450,323, filed Dec. 16, 1982, which is a continuation of application Ser. No. 218,157, filed Dec. 19, 1980 both abandoned.

Background of the Invention

Pressure vessels are commonly provided with safety valves to prevent rupture of the vessels from unusually high pressures exceeding vessel specifications. It is essential that such safety valves be highly dependable in operation. When the contents of the vessel are corrosive, subject to foaming or bubbling, or leave residue on the vessel walls, the safety valve may become clogged, stuck or otherwise inhibited in performance and activate or trigger, if at all, at a higher pressure than is safe for the vessel. Safety valves which are intended to accommodate these situations can be expensive, being complex and made of exotic materials, and can be difficult to install and maintain in suitable working condition. Accordingly, there is a need in the art for a single-use safety valve which is both inexpensively constructed of non-exotic materials and fully reliable to trigger at a selected pressure. Such a valve is provided by the present invention, as will be evident from the following disclosure.

SUMMARY OF THE INVENTION

Apparatus is provided by the present invention for use as a safety pressure release valve in pressure vessel wall. The pressure vessel may be any vessel employed in any environment to maintain liquid or gaseous components under internal or external pressure.

More specifically, a vessel is provided with a safety pressure release valve composed of a partially buckled, hollow chamber like a partially buckled capped pipe susceptible to further buckling at a preselected pressure, the chamber being mounted and sealed in an opening in a wall of the vessel. More preferably, an elastomeric ring gasket is in the opening and the chamber is mounted and sealed by the gasket.

The partially buckled, hollow chamber is preferably of cylindrical or near cylindrical shape and partially buckled or collapsed, at least at one end, so that when the external pressure differential exceeds a predetermined value, the chamber will buckle further and flatten and thus lose most of its original shape, hereby allowing rapid escape of pressure and thus a large volume release of fluid from the vessel. The vessel is thus relieved of the high pressure, rendering it structurally safe.

BRIEF DESCRIPTION OF THE DRAWINGS

FIG. 1 discloses a preferred embodiment of the invention wherein a pressure release safety valve is deployed in a pressure vessel wall.

FIGS. 2A, 2B and 2C show preferred steps in making a partially buckled chamber for use as a safety valve.

DESCRIPTION OF PREFERRED EMBODIMENTS

The present invention provides a technique for utilization of a failure mechanism, e.g, the gross flattening of a cylindrical chamber under pressure, to perform a useful function through the rapid, pressure-actuated release of a fluid or gas from a pressure vessel through a relatively large opening. The nature of this so-called propagating buckle of a cylindrical vessel under external pressure is such that there is a large change in shape from, for instance, a dented cylindrical to a fully-flattened shape. In this way the actuation, or triggering, of the valve mechanism can be made to cause a quick release of pressure from a vessel. This passive but quick release through a large opening makes it possible to use this type of failure mechanism to its fullest extent.

Referring now to the drawings and in particular, to FIG. 1 thereof, there is shown a partially buckled cylindrical chamber 10 used as a safety valve in pressure vessel wall 11. The partially collapsed chamber 10 is supported by an elastic ring gasket 12 in an opening in the pressure vessel wall, and the chamber is maintained in position with an elastomeric ring gasket by a support frame 13. The support frame can be either external or internal to the vessel. The precollapsed part of the chamber must face toward the high pressure side of the chamber. Collapse of the chamber 10 causes the walls of the chamber to pull away from the elastic ring gasket, as the chamber flattens, and allow flow of fluid and loss or pressure to the surrounding environment. The release valve failure mechanism is essentially unaffected by the contents of the container, whether corrosive, foaming, film depositing, etc., and reliably responds without exception to excess pressures in the vessel 11.

It will be apparent that the trigger or chamber 10 can be utilized with other deformable seals than an elastomeric ring gasket, provided a snug fit is provided between the trigger and the pressure vessel wall. An elastomeric material may be coated over the chamber so that it provides a good seal with the vessel wall. While a cylindrical vessel wall is shown, it is manifest that for any type of vessel or other container wherein pressure exists which may need to be vented, the release valve of the present invention can be successfully employed.

In FIGS. 2A, 2B and 2C, the steps of making a prebuckled or precollapsed chamber for the valve 10 is shown in steps A, B and C. In Step A, a chamber such as capped pipe 30 is mechanically dented in the center. Chambers which are triangular, rectangular or elliptical in shape may be employed, and other techniques for denting the chamber may be effected using presses, hammers, etc. In Step B, a pressure vessel 31 encompasses the capped and dented pipe 30 and a hydraulic fluid 32 under pressure is passed there-into. The buckle initiated in Step B is propagated by the hydraulic fluid. The pressure required to propagate the buckle is noted since this will become the characteristic collapse pressure of the valve. In Step C, the pipe is cut in half and welded or otherwise closed at midsection 33. Other fittings or attaching means can be welded or otherwise joined to the flattened, closed pipe to permit its mounting and use as a safety release valve. Once a valve actuates it cannot easily be closed again so the chamber must be replaced using the same mounting and perhaps the same seal. This is manifestly but one method for preparing the prebuckled or precollapsed valve unit, and it will be obvious that the unit can be prepared by other methods and still function in accordance with the present invention which relies upon the phenomenon of a propagating buckle.

What is claimed is:

1. A method for providing a vessel with a pressure relief safety valve comprising, in combination, the steps of mechanically denting a pipe, closing the ends of the pipe, subjecting the dented pipe to fluid pressure to propagate the dent to a partial buckle of the pipe, severing the pipe chambers, closing the severed end of at least one partially buckled chamber, and mounting and sealing said one partially buckled chamber in an opening in a wall of said vessel.

2. A method for providing a vessel with a pressure relief safety valve comprising, in combination, the steps of denting a chamber, subjecting the dented chamber to fluid pressure to propagate the dent to a partial buckle of the chamber, severing the chamber at the partial buckle to form separate partially buckled chambers, closing the severed end of at least one partially buckled chamber, and mounting and sealing said partially buckled chamber in an opening in a wall of said vessel.

3. A method for providing a vessel with a pressure relief safety valve comprising, in combination, the steps of partially buckling a chamber at a preselected pressure, and mounting and sealing the partially buckled chamber in an opening in a wall of said vessel, said chamber being susceptible to further buckling after said predetermined pressure is reached in said vessel.

4. The method of claim 1, 2 or 3 including pressuring the vessel at least up to the pressure of propagating the dent and further propagating the buckle of the chamber in the wall of said vessel, and relieving pressure from the vessel past the further buckled chamber.

* * * * *